US007609456B2

(12) United States Patent
Saori

(10) Patent No.: US 7,609,456 B2
(45) Date of Patent: Oct. 27, 2009

(54) STANDARD ZOOM LENS SYSTEM

(75) Inventor: Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/957,718

(22) Filed: Dec. 17, 2007

(65) Prior Publication Data

US 2008/0144190 A1    Jun. 19, 2008

(30) Foreign Application Priority Data

Dec. 18, 2006    (JP) .............................. 2006-339293

(51) Int. Cl.
*G02B 15/14*    (2006.01)

(52) U.S. Cl. ..................................... 359/687

(58) Field of Classification Search ......... 359/680–682, 359/686–687, 683, 774; 348/240.99–240.3; 396/72–88
See application file for complete search history.

(56) References Cited

U.S. PATENT DOCUMENTS

| | | | |
|---|---|---|---|
| 6,191,895 B1 * | 2/2001 | Arimoto et al. ............. | 359/686 |
| 6,353,505 B1 | 3/2002 | Yoneyama | |
| 6,487,023 B2 | 11/2002 | Yoneyama | |
| 6,822,807 B2 | 11/2004 | Yoneyama | |
| 6,867,925 B1 * | 3/2005 | Sato ............................ | 359/690 |
| 7,283,311 B2 | 10/2007 | Saori | |
| 7,301,711 B2 | 11/2007 | Saori | |
| 7,333,274 B2 * | 2/2008 | Hozumi ...................... | 359/687 |
| 7,339,748 B2 * | 3/2008 | Terada et al. ............... | 359/687 |
| 2003/0165020 A1 * | 9/2003 | Satori et al. ................. | 359/686 |
| 2004/0223070 A1 | 11/2004 | Shirasuna | |
| 2005/0243437 A1 * | 11/2005 | Hozumi et al. .............. | 359/687 |
| 2007/0127136 A1 | 6/2007 | Saori | |

FOREIGN PATENT DOCUMENTS

| | | |
|---|---|---|
| JP | 2002-6217 | 1/2002 |
| JP | 2003-50350 | 2/2003 |
| JP | 2004-37921 | 2/2004 |
| JP | 2004-333770 | 11/2004 |

* cited by examiner

*Primary Examiner*—Darryl J Collins
*Assistant Examiner*—Zachary Wilkes
(74) *Attorney, Agent, or Firm*—Greenblum & Bernstein, PLC

(57) ABSTRACT

A standard zoom lens system including a positive first lens group, a negative second lens group, a positive third lens group and a positive fourth lens group. Upon zooming from the short focal length extremity to the long focal length extremity, the positive first lens group, the positive third lens group and the positive fourth lens group move toward the object, and the negative second lens group moves toward the image and thereafter moves toward the object. The positive first lens group includes a negative lens element and a positive lens element. The standard zoom lens system satisfies the following conditions:

$$7.5 < f1/|f2| < 9.5 \quad (1)$$

$$3.0 < f1/f3 < 5.0 \quad (2)$$

wherein
f1 designates the focal length of the positive first lens group;
f2 designates the focal length of the negative second lens group; and
f3 designates the focal length of the positive third lens group.

19 Claims, 7 Drawing Sheets

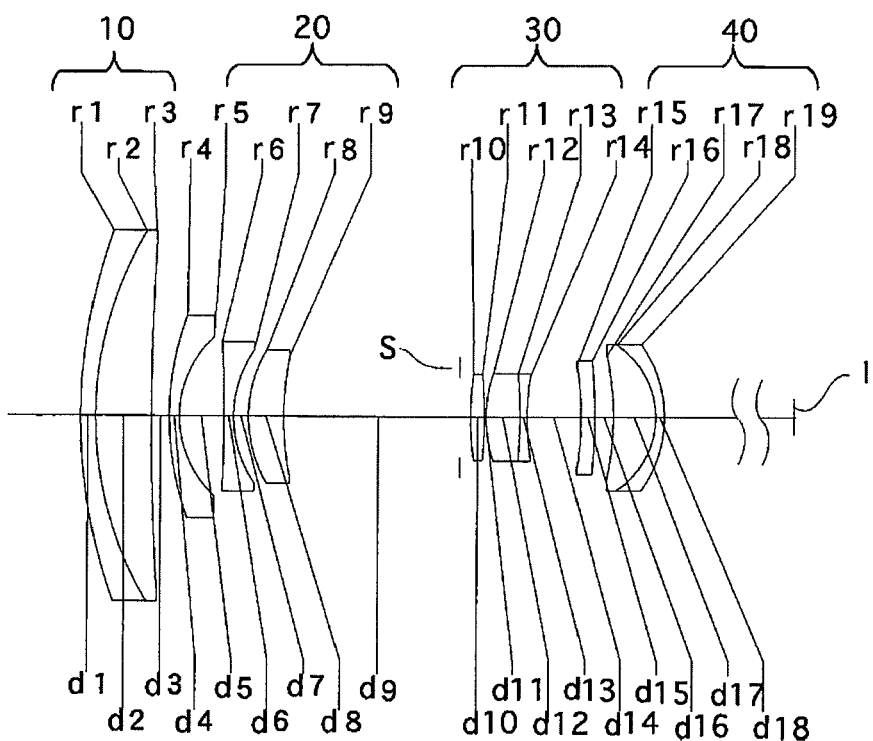
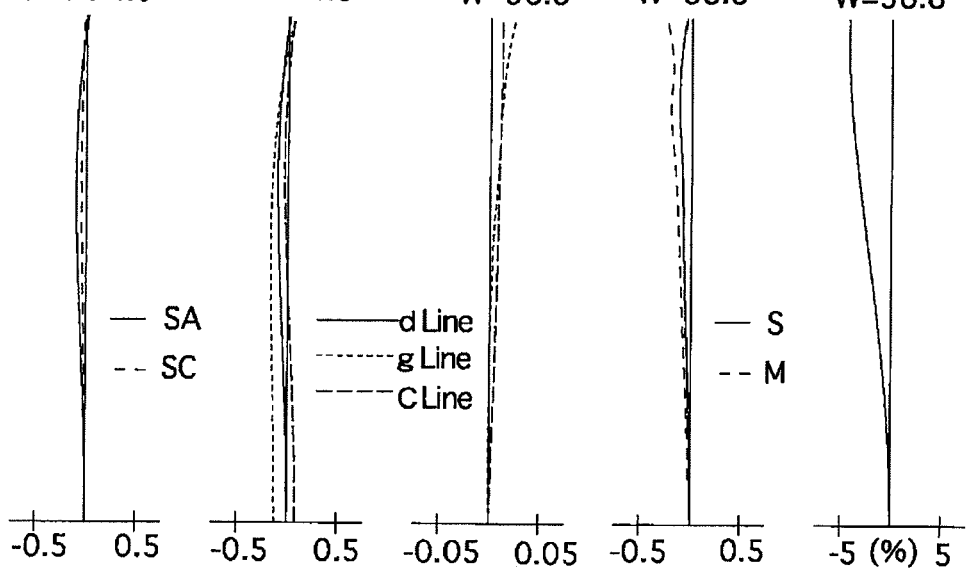

STANDARD ZOOM LENS SYSTEM

BACKGROUND OF THE INVENTION

1. Field of the Invention

The present invention relates to a zoom lens system suitable for use in a single lens reflex (SLR) digital camera, and in particular, relates to a standard zoom lens system having the range of an angle-of-view including an angle-of-view of approximately 45° (a standard lens system) which is equivalent to 50 mm in the case of an SLR camera with a 35 mm-film format.

2. Description of the Prior Art

As standard zoom lens systems, a negative-lead type zoom lens system and a positive-lead type zoom lens system are known in the art.

The negative-lead type zoom lens system is constituted by, e.g., a lens group having a negative refractive power (hereinafter, a negative lens group) and a lens group having a positive refractive power (hereinafter, a positive lens group), in this order from the object, or, a negative lens group, positive lens group, a negative lens group and a positive lens group construction, in this order from the object.

The positive-lead type zoom lens system is constituted by, e.g., a positive lens group, a negative lens group, a positive lens group and a positive lens group construction, in this order from the object.

The negative-lead type zoom lens system has at least the following advantages: (i) the production cost is low, (ii) the mechanical structure is simple, and (iii) the negative-lead type zoom lens system is easy to be manufactured due to low sensitivity.

On the other hand, the negative-lead type zoom lens system has the following disadvantages: (i) the zoom ratio cannot be made large, (ii) the fluctuation of F-number upon zooming is large, and (iii) the front lens group is large and heavy since focusing is performed by the front lens group.

The positive-lead type zoom lens system has at least the following advantages: (i) the zoom ratio can be made large, (ii) the fluctuation of F-number upon zooming is small, and (iii) the focusing lens group can be made light (less heavy) by employing an internal focusing lens system.

On the other hand, the positive-lead type zoom lens system has the following disadvantages: (i) the production cost is high, (ii) the mechanical structure is complex, and (iii) the positive-lead type zoom lens system is difficult to be manufactured due to high sensitivity.

Examples of the prior art can be found in Japanese Unexamined Patent Publication Nos. 2002-6217, 2003-50350, 2004-37921 and 2004-333770.

SUMMARY OF THE INVENTION

The present invention is to provide a positive-lead type standard zoom lens system in which the number of lens elements is smaller, a higher zoom ratio is attained, the structure thereof is simpler, and the production costs is lower; and the positive-lead type standard zoom lens system includes a positive lens group, a negative lens group, a positive lens group and a positive lens group, in this order from the object.

Furthermore, the present invention is to provide a standard zoom lens system suitable for a digital SLR camera which requires a relatively long back focal distance compared with the focal length.

In other words, since the size of the imaging device of a digital SLR camera is relatively smaller than the picture frame size of a 35 mm-format film, the angle-of-view with respect to the same focal length becomes narrower in the imaging device.

Accordingly, in order to achieve the same angle-of-view in a photographing operation with a digital SLR camera, the focal length must be shortened.

On the other hand, in order to satisfy the user's desire to use a 35 mm-format interchangeable lens which they already own with a digital SLR camera, the flange back which is the same as that of a 35 mm-format SLR camera has to be provided for a digital SLR camera.

Accordingly, in an interchangeable lens for a digital camera, both a shorter focal length and a longer back focal distance have to be achieved.

The present invention is, more specifically, to provide a standard zoom lens system which is miniaturized and has superior optical performance with the following features, while the standard zoom lens system has a longer back focal distance compared with the focal length:

(i) a zoom ratio is 3.7 (a higher zoom ratio); and (ii) an angle-of-view is approximately 23° at the short focal length extremity, and is 80° at the long focal length extremity.

According to an aspect of the present invention, there is provided a standard zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group) and a fourth lens group having a positive refractive power (hereinafter, a positive fourth lens group), in this order from the object.

Upon zooming from the short focal length extremity to the long focal length extremity, the positive first lens group, the positive third lens group and the positive fourth lens group move toward the object, and the negative second lens group moves toward the image and thereafter moves toward the object.

The positive first lens group includes a negative lens element and a positive lens element.

The standard zoom lens system satisfies the following conditions:

$$7.5 < f1/|f2| < 9.5 \qquad (1)$$

$$3.0 < f1/f3 < 5.0 \qquad (2)$$

wherein f1 designates the focal length of the positive first lens group;

f2 designates the focal length of the negative second lens group; and f3 designates the focal length of the positive third lens group.

The above standard zoom lens system preferably satisfies the following condition:

$$7.0 < f1/fw < 10.0 \qquad (3)$$

wherein f1 designates the focal length of the positive first lens group; and fw designates the focal length of the entire standard zoom lens system at the short focal length extremity.

According to another aspect of the present invention, there is provided a standard zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group) and a fourth lens group having a positive refractive power (hereinafter, a positive fourth lens group), in this order from the object.

Upon zooming from the short focal length extremity to the long focal length extremity, the positive first lens group, the positive third lens group and the positive fourth lens group move toward the object, and the negative second lens group moves toward the image and thereafter moves toward the object.

The positive first lens group includes a negative lens element and a positive lens element.

The standard zoom lens system satisfies the following condition:

$$7.0 < f1/fw < 10.0 \quad (3)$$

wherein f1 designates the focal length of the positive first lens group; and fw designates the focal length of the entire standard zoom lens system at the short focal length extremity.

Furthermore, the standard zoom lens system of the above two aspects of the present invention has the following features.

The negative lens element and the positive lens element of the positive first lens group are preferably cemented to each other.

The negative second lens group preferably includes two negative lens elements and a positive lens element.

More specifically, the negative second lens group preferably includes a negative meniscus lens element having the convex surface facing toward the object, a negative lens element having a concave surface facing toward the image, and a positive lens element having a convex surface facing toward the object, in this order from the object.

The standard zoom lens system preferably satisfies the following conditions:

$$0.7 < |f2|/fw < 1.2 \quad (4)$$

$$1.68 < Nn < 1.79 \quad (5)$$

wherein f2 designates the focal length of the negative second lens group;

fw designates the focal length of the entire standard zoom lens system at the short focal length extremity; and Nn designates the refractive index of the d-line of each the negative lens element in the negative second lens group.

The positive third lens group preferably includes a positive lens element, and cemented lens elements having a positive lens element and a negative lens element.

The positive fourth lens group preferably includes one of a positive aspherical lens element and a negative aspherical lens element, and cemented lens elements having a positive lens element and a negative lens element.

In the positive fourth lens group, both lens surfaces of said aspherical lens element are formed as aspherical surfaces.

In the positive fourth lens group, an aspherical lens element is preferably a plastic molded lens element.

The standard zoom lens system preferably satisfies the following condition:

$$1.0 < f4/f3 < 3.0 \quad (6)$$

wherein f4 designates the focal length of the positive fourth lens group; and f3 designates the focal length of the positive third lens group.

The negative second lens group preferably functions as a focusing lens group.

The standard zoom lens system preferably satisfies the following condition:

$$0.6 < |f12w|/f34w < 0.8 \quad (7)$$

wherein f12w designates the combined focal length of the positive first lens group and the negative second lens group at the short focal length extremity; and f34w designates the combined focal length of the positive third lens group and the positive fourth lens group at the short focal length extremity.

The present disclosure relates to subject matter contained in Japanese Patent Application No. 2006-339293 (filed on Dec. 18, 2006) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the standard zoom lens system, at the short focal length extremity, according to a first embodiment of the present invention;

FIGS. 2A, 2B, 2C, 2D and 2E show aberrations occurred in the lens arrangement shown in FIG. 1;

DESCRIPTION OF THE PREFERRED EMBODIMENTS

Figure 13:
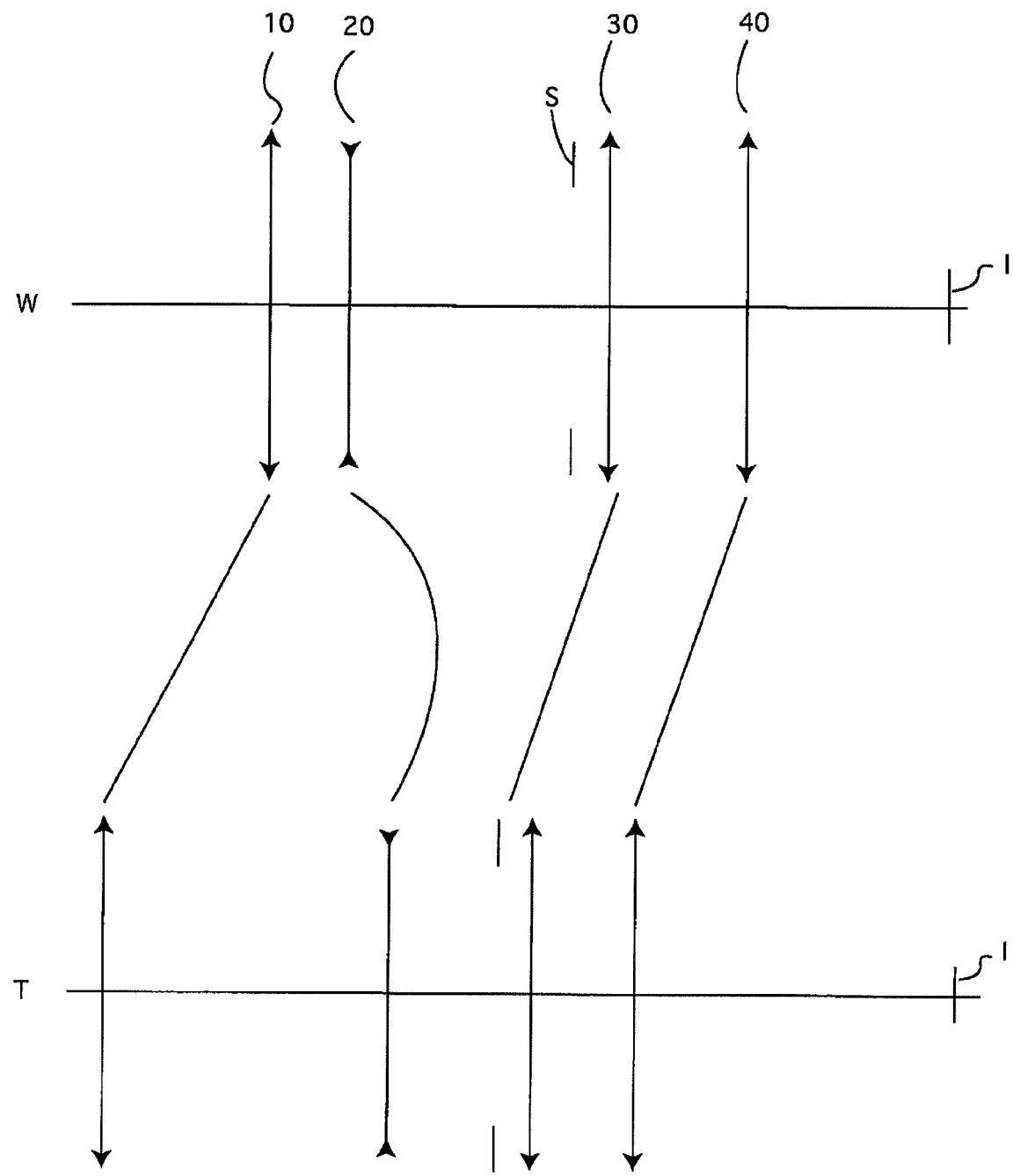
FIG. 13 is lens-group moving paths of the standard zoom lens system according to the present invention.

A standard zoom lens system of the present invention, as shown in the zoom path of FIG. 13, includes a positive first lens group 10, a negative second lens group 20, a positive third lens group 30 and a positive fourth lens group 40, in this order from the object.

Upon zooming from the short focal length extremity to the long focal length extremity, the positive first lens group 10, the positive third lens group 30 and the positive fourth lens group 40 move monotonically toward the object, and the negative second lens group 20 first moves toward the image and thereafter moves toward the object.

An aperture-size variable diaphragm S is provided between the negative second lens group 20 and the positive third lens group 30, and moves together with the positive third lens group 30.

Focusing is performed by the negative second lens group 20.

'I' shown in the drawings represents the image plane.

As illustrated in the embodiments shown in FIGS. 1, 3, 5, 7, 9 and 11, the positive first lens group 10 is constituted by cemented lens elements having negative meniscus lens element having the convex surface facing toward the object and a positive meniscus lens element having the convex surface facing toward the object, in this order from the object.

The negative second lens group 20 is constituted by a negative meniscus lens element having the convex surface facing toward the object, a bi-concave negative lens element, and a positive meniscus lens element having the convex surface facing toward the object, in this order from the object.

The positive third lens group 30 is constituted by a bi-convex positive lens element, and cemented lens elements including a bi-convex positive lens element and a bi-concave negative lens element, in this order from the object.

The positive fourth lens group 40 is constituted by a positive or a negative aspherical meniscus lens element having the convex surface facing toward the image, and cemented lens elements having a positive meniscus lens element having the convex surface facing toward the image and a negative meniscus lens element having the convex surface facing toward the image, in this order from the object.

Conditions (1) and (2) are provided for correcting aberrations while a shorter focal length and a longer back focal distance are maintained at the short focal length extremity.

By satisfying these conditions, a drawback in a positive-lead type zoom lens system, i.e., a back focal distance becomes shorter compared with that of a negative-lead type zoom lens system, can be eliminated.

Condition (1) specifies the ratio of the focal length (positive refractive power) of the positive first lens group 10 to that of the negative second lens group 20.

Condition (2) specifies the ratio of the focal length (positive refractive power) of the positive first lens group 10 to that of the positive second lens group 30.

By satisfying condition (1), the negative lens group 20 can be positioned much closer to the object, particularly at the short focal length extremity, though the standard zoom lens system is a positive-lead type zoom lens system. Consequently, it become easier to attain a longer back focal distance relative to the focal length.

However, only condition (1) cannot suitably correct aberrations occurred due to the strong negative refractive power of the negative second lens group 20. Then, by satisfying condition (2), the positive third lens group 30 is provided with an adequate positive refractive power, so that aberrations occurred in the negative second lens group 20 can be corrected.

If f1/|f2| exceeds the lower limit of condition (1), it becomes difficult to make the back focal distance longer, similar to a conventional positive-lead type zoom lens system. In this state (i.e., with the lower limit of condition (1) being exceeded), if an attempt is made to secure a longer back focal distance, and at the same time, to correct aberrations, the positive first lens group 10 is required to have a stronger diverging surface. Consequently, the correcting of aberrations (in particular off-axis aberrations) occurred on the diverging surface becomes difficult.

If f1/|f2| exceeds the upper limit of condition (1), the negative refractive power of the negative second lens group 20 becomes too strong. Consequently, the correcting of aberrations occurred in the negative second lens group 20 becomes difficult.

If f1/f3 exceeds the lower limit of condition (2), the positive refractive power of the positive third lens group 30 becomes weaker. Consequently, in the negative second lens group 20, aberrations caused by the strong negative refractive power to attain a longer back focal distance cannot be corrected.

If f1/f3 exceeds the upper limit of condition (2), the positive refractive power of the positive third lens group 30 becomes too strong, so that it becomes difficult to correct aberrations occurred in the positive third lens group 30.

If an attempt is made to satisfy both conditions (1) and (2) at the same time, the positive refractive power of the positive first lens group 10 can relatively be made weaker with respect to those of those of the negative second lens group 20 and the positive third lens group 30. As a result, it becomes relatively easier to correct aberrations occurred in the positive first lens group 10; and it is therefore sufficient that the positive first lens group 10 can be constituted by a negative lens element and a positive lens element only.

Condition (3) specifies the ratio of the focal length of (positive refractive power) the positive first lens group 10 to that of the entire standard zoom lens system at the short focal length extremity. This condition is formulated due to the fact that the refractive power of the positive first lens group 10 is relatively weaker than that of a conventional first lens group; and condition (3) is provided to adequately correct aberrations while the positive first lens group 10 is constituted by a positive lens element and a negative lens element only.

If f1/fw exceeds the lower limit of condition (3), the positive refractive power of the positive first lens group 10 becomes stronger. However, even though a necessary back focal distance is secured, aberrations occurred in the positive first lens group 10 cannot be sufficiently corrected with the two-lens-arrangement (i.e., the positive lens element and the negative lens element) of the positive first lens group 10. Here, note that in a conventional zoom lens system, a value corresponding to the lower limit value of condition (3) was set lower than the lower limit of condition (3) (i.e., lower than 7).

If f1/fw exceeds the upper limit of condition (3), the refractive power of the positive first lens group 10 becomes too weak, so that the correcting of off-axis aberrations at the short focal length extremity becomes difficult.

The negative second lens group 20 is constituted by of the three-lens-element arrangement, i.e., a negative lens element, a negative lens element and a positive lens element, in this order from the object.

In the case of a conventional zoom lens system of the four-lens-group arrangement, e.g., a positive lens group, a negative lens group, a positive lens group and a positive lens group, in this order from the object, the second lens group is generally constituted by four lens elements, e.g., a negative lens element, a negative lens element, a positive lens element and a negative lens element in this order from the object, or more.

If the number of lens elements of the second lens group can be reduced from "four lens elements" to "three lens-elements", the structure thereof can be made simpler, and reduction on both weight and production costs of the standard zoom lens system can be attained. More importantly, since the second lens group is a focusing lens group, the burden on the focusing mechanism can be minimized due to the reduction in weight.

Condition (4) is provided to suitably correct aberrations while the negative second lens group 20 is constituted by three lens elements.

If |f2|/fw exceeds the lower limit of condition (4), the negative refractive power of the negative second lens group 20 becomes stronger. Consequently, the negative second lens group 20 of the three lens elements, i.e., the negative lens element, the negative lens element and the positive lens element, cannot sufficiently correct aberrations.

If f2/fw exceeds the upper limit of condition (4), the refractive power of the negative second lens group 20 becomes weaker. As a result, it becomes necessary to provide a strong diverging surface in the positive first lens group 10 in order to secure a sufficiently long back focal distance; and the correcting of aberrations in the positive first lens group 10 becomes difficult.

In the negative second lens group 20, the lens elements arranged from the object side are preferably a negative meniscus lens element having the convex surface facing toward the object, a negative lens element having a concave surface facing toward the image, and a positive lens element having a convex surface facing toward the object, in this order from the object.

Namely, if a concave surface of the most-object side negative lens element (the negative meniscus lens element) faces toward the object, off-axis light rays are deflected sharply at the short focal length extremity. Due to this arrangement, distortion and astigmatism undesirably and largely occur. Therefore it is preferable that the most-object side negative lens element have a convex surface facing toward the object.

Further, in order to provide the second negative lens element counted from the object with a negative refractive power sufficiently, it is preferable that the second negative lens element have a concave surface facing toward the image. If the second negative lens element has a convex surface facing toward the image, the curvature of the concave surface facing toward the object becomes stronger (sharper), so that distortion and astigmatism undesirably and largely occur.

In the most-image side positive lens element (the positive lens element), if a concave surface faces toward the object, the curvature of the convex surface facing toward the image becomes stronger (sharper), so that spherical aberration and coma undesirably and largely occur.

Condition (5) specifies a glass material used for the negative lens elements in the negative second lens group 20. There are two negative lens elements in the negative second lens group 20, and it is preferable that both two negative lens elements satisfy condition (5).

If Nn exceeds the lower limit of condition (5), the curvature of the concave surface becomes stronger (sharper) in order to attain a predetermined (required) amount of refractive power. Consequently, distortion and astigmatism largely occur.

If Nn exceeds the upper limit of condition (5), the correcting of lateral chromatic aberration, in particular, becomes difficult, since there is no glass material having a large Abbe number (i.e., smaller dispersion). Moreover, a glass material is expensive, so that reduction on the production costs cannot be attained.

In the standard zoom lens system of the present invention, the positive third lens group 30 is arranged to mainly perform image-forming, and the positive fourth lens group 40 is arranged to correct field curvature and astigmatism.

If image-forming is mainly performed by the positive fourth lens group 40, the positive fourth lens group 40 has to carry out all the correcting of axial aberration (mainly spherical aberration) and off-axis aberrations (mainly field curvature and astigmatism). In such a case, the structure of the positive fourth lens group 40 becomes undesirably complicated, and sensitivity in assembling becomes higher.

Condition (6) specifies the ratio of the focal length (refractive power) of the positive third lens group 30 to that of the positive fourth lens group 40.

If f4/f3 exceeds the upper limit of condition (6), the refractive power of the positive third lens group 30 becomes too strong with respect to that of the positive fourth lens group 40. As a result, the correcting of spherical aberration and coma becomes difficult.

If f4/f3 exceeds the lower limit of condition (6), the refractive power of the positive fourth lens group 40 becomes stronger with respect to that of the positive third lens group 30. As a result, the correcting of spherical aberration and coma becomes difficult to be compatible with the correcting of filed curvature and astigmatism.

The positive third lens group 30 which functions to correct spherical aberration is constituted by a bi-convex positive lens element, and cemented lens elements having a bi-convex positive lens element and a bi-concave negative lens element, in this order from the object. Since the positive third lens group 30 is positioned closer to the diaphragm S, the diameter thereof is small, and therefore even if the number of lens elements is increased from two to three, the weight and production costs of the positive third lens group 30 is substantially unchanged. Furthermore, due to having two positive lens elements, the refractive power in the positive third lens group 30 can be distributed; and this arrangement of the two positive lens elements is effective to reduce sensitivity in assembling.

The positive fourth lens group 40 which functions to mainly correct field curvature and astigmatism is constituted by a positive or negative aspherical lens element and cemented lens elements having a positive lens element and a negative lens element, i.e., a positive or a negative aspherical meniscus lens element having the convex surface facing toward the image, and cemented lens elements having a positive meniscus lens element having the convex surface facing toward the image and a negative meniscus lens element having the convex surface facing toward the image, in this order from the object.

In both the positive third lens group 30 and the positive fourth lens group 40, by employing the cemented lens elements, sensitivity in assembling can be reduced.

In the positive fourth lens group 40, on the object-side of the cemented lens elements, the positive or negative aspherical meniscus lens element is provided with a weaker refractive power. Accordingly, the weaker refractive power may be either positive or negative.

By the aspherical lens element, various aberrations such as coma are corrected in a well balanced manner.

It is preferable that the aspherical lens element be formed by plastic molding. This is because an aspherical lens element formed by plastic molding is lighter in weight, and lower in production costs than a glass-molded aspherical lens element and a hybrid aspherical lens element in which a resin aspherical layer is bonded on a glass lens element.

In order to correct aberrations more suitably, the correcting of aberrations by utilizing the combined focal lengths of the lens groups of the standard zoom lens system can be performed as indicated in condition (7), i.e., the standard zoom lens system preferably satisfies the following condition:

$$0.6 < |f12w|/f34w < 0.8 \quad (7)$$

wherein f12w designates the combined focal length of the positive first lens group and the negative second lens group at the short focal length extremity; and f34w designates the combined focal length of the positive third lens group and the positive fourth lens group at the short focal length extremity.

If |f12w|/f34w exceeds the upper limit of condition (7), the refractive power of a negative front lens group (i.e., the positive first lens group 10 and the negative second lens group 20) becomes weaker, so that it is disadvantageous to secure a sufficiently long back focal distance.

In order to attain a longer back focal distance, it is necessary to provide a longer distance between the front lens group (i.e., the first lens group 10 and the second lens group 20) and a rear lens group (i.e., the positive third lens group 30 and the positive fourth lens group 40); however, the overall length of the standard zoom lens system becomes longer, and the diameter of the frontmost lens (the positive first lens group 10) becomes larger. Moreover, the refractive power of the positive rear lens group is stronger, so that spherical aberration easily occurs.

If |f12w|/f34w exceeds the lower limit of condition (7), the refractive power of the negative front lens group (i.e., the positive first lens group 10 and the negative second lens group 20) becomes stronger, and the correcting of distortion and astigmatism becomes difficult.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, PNO. designates the F-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 3:
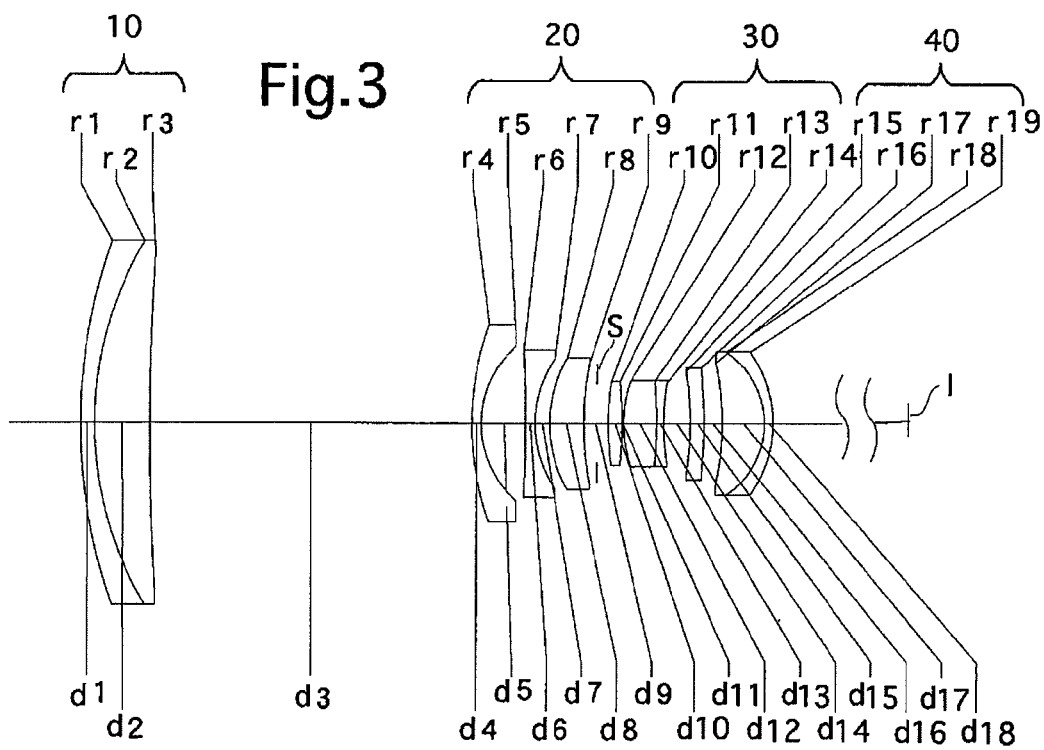
FIG. 3 is a lens arrangement of the standard zoom lens system, at the long focal length extremity, according to the first embodiment of the present invention.
Figures 4A, 4B, 4C, 4D, 4E:
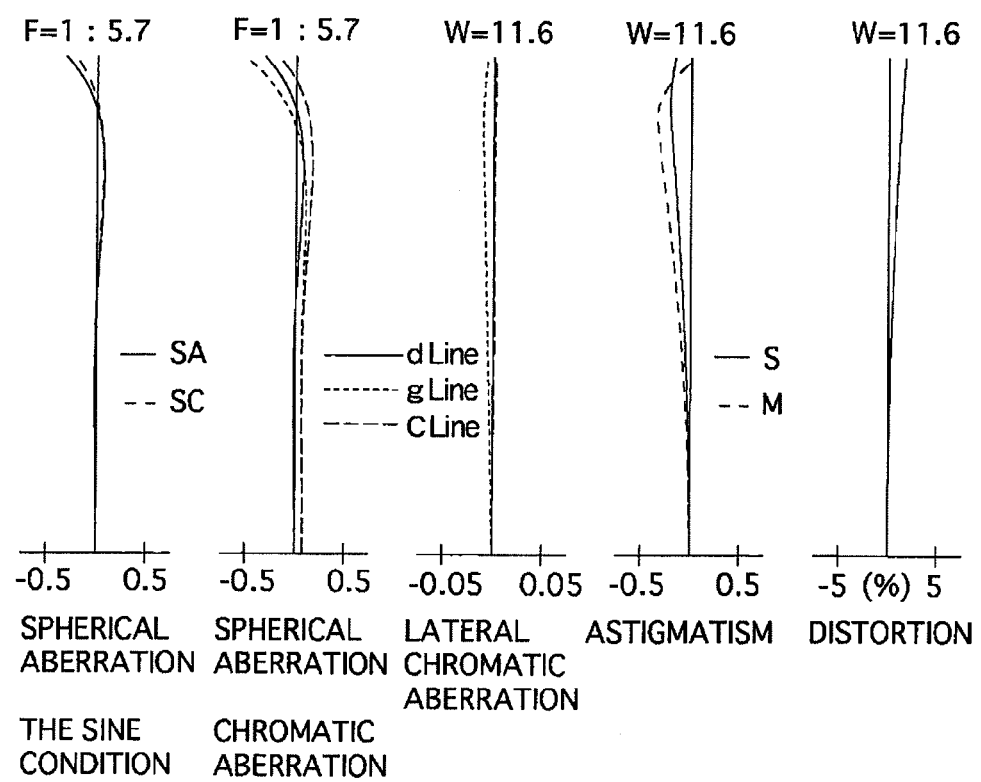
FIGS. 4A, 4B, 4C, 4D and 4E show aberrations occurred in the lens arrangement shown in FIG. 3.

FIG. 1 is a lens arrangement of the standard zoom lens system, at the short focal length extremity, according to the first embodiment of the present invention. FIGS. 2A through 2E show aberrations occurred in the lens arrangement shown in FIG. 1. FIG. 3 is a lens arrangement of the standard zoom lens system, at the long focal length extremity, according to the first embodiment of the present invention. FIGS. 4A through 4E show aberrations occurred in the lens arrangement shown in FIG. 3.

The first embodiment of the standard zoom lens system includes a positive first lens group 10, a negative second lens group 20, a diaphragm S, a positive third lens group 30, and a positive fourth lens group 40, in this order from the object.

The positive first lens group 10 is constituted by cemented lens elements having negative meniscus lens element having the convex surface facing toward the object and a positive meniscus lens element having the convex surface facing toward the object, in this order from the object.

The negative second lens group 20 is constituted by a negative meniscus lens element having the convex surface facing toward the object, a bi-concave negative lens element (a negative lens element having a concave surface facing toward the image), and a positive meniscus lens element having the convex surface facing toward the object, in this order from the object.

The positive third lens group 30 is constituted by a bi-convex positive lens element, and cemented lens elements having a bi-convex positive lens element and a bi-concave negative lens element, in this order from the object.

The positive fourth lens group 40 is constituted by a positive aspherical meniscus lens element having a weaker refractive power (one of a positive aspherical lens element and a negative aspherical lens element), and cemented lens elements having a positive meniscus lens element having the convex surface facing toward the image and a negative meniscus lens element having the convex surface facing toward the image, in this order from the object. In the positive aspherical meniscus lens element, both lens surfaces are made aspherical.

The diaphragm S is provided 1.50 in front the third lens group 30 (surface No. 10).

TABLE 1

F = 1:4.0-4.7-5.7
f = 18.50-35.08-68.00 (Zoom Ratio = 3.68)
W = 38.8-21.9-11.6
fB = 39.44-54.59-72.10

| Surf. No. | r | d | Nd | ν |
|---|---|---|---|---|
| 1 | 75.622 | 2.00 | 1.80518 | 25.4 |
| 2 | 50.096 | 7.74 | 1.69680 | 55.5 |
| 3 | 378.488 | 2.50-21.00-45.46 | — | — |
| 4 | 40.372 | 1.40 | 1.77250 | 49.6 |
| 5 | 14.964 | 6.26 | — | — |
| 6 | −193.508 | 1.30 | 1.77250 | 49.6 |
| 7 | 16.380 | 2.08 | — | — |
| 8 | 18.223 | 4.87 | 1.84666 | 23.8 |
| 9 | 44.373 | 25.99-11.50-3.50 | — | — |
| 10 | 39.754 | 1.94 | 1.50581 | 60.6 |
| 11 | −58.667 | 0.22 | — | — |
| 12 | 18.643 | 4.69 | 1.48749 | 70.3 |
| 13 | −72.867 | 1.00 | 1.80000 | 42.8 |
| 14 | 37.232 | 7.39-5.00-3.73 | — | — |
| 15* | −50.229 | 2.00 | 1.52538 | 56.3 |
| 16* | −46.570 | 2.58 | — | — |
| 17 | −41.070 | 5.93 | 1.62935 | 59.0 |
| 18 | −12.123 | 1.20 | 1.80500 | 25.4 |
| 19 | −17.369 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 15 | 0.00 | $-0.26595 \times 10^{-5}$ | | |
| 16 | 0.00 | $0.48429 \times 10^{-4}$ | $0.28535 \times 10^{-6}$ | $-0.16386 \times 10^{-8}$ |

Embodiment 2

Figure 5:
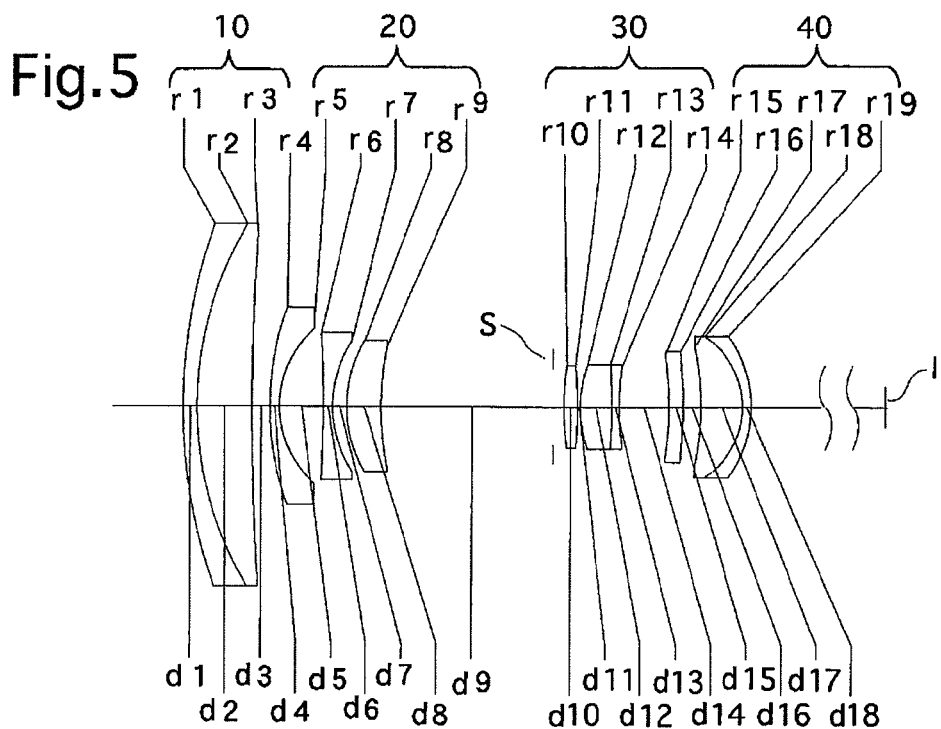
FIG. 5 is a lens arrangement of the standard zoom lens system, at the short focal length extremity, according to a second embodiment of the present invention.
Figures 6A, 6B, 6C, 6D, 6E:
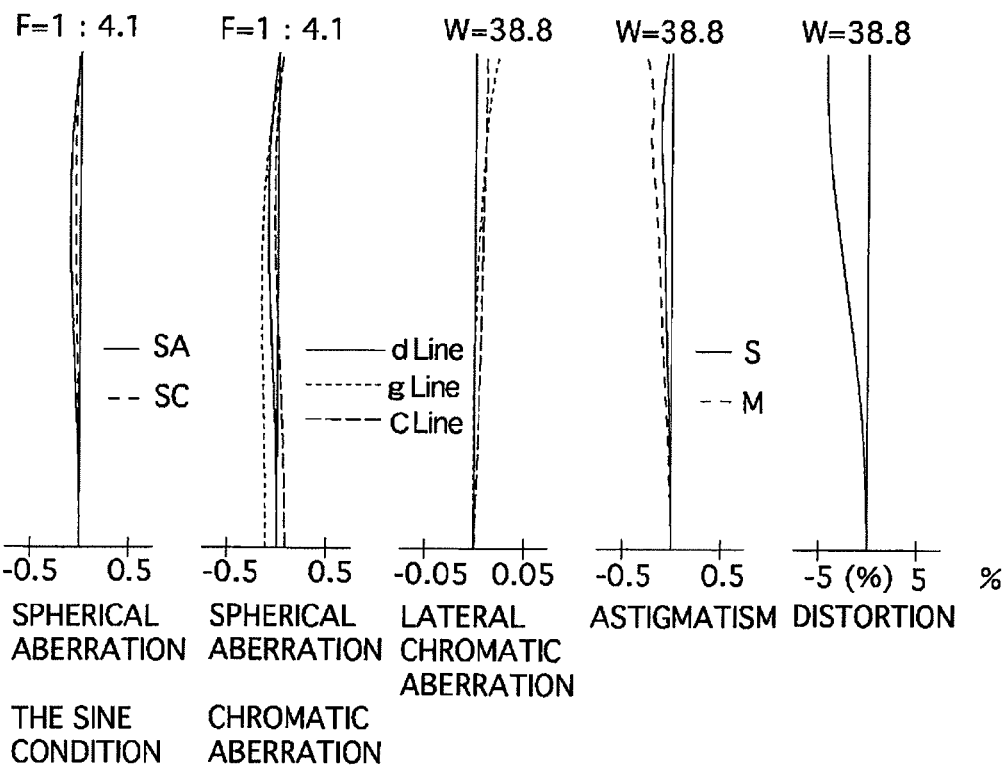
FIGS. 6A, 6B, 6C, 6D and 6E show aberrations occurred in the lens arrangement shown in FIG. 5.
Figure 7:
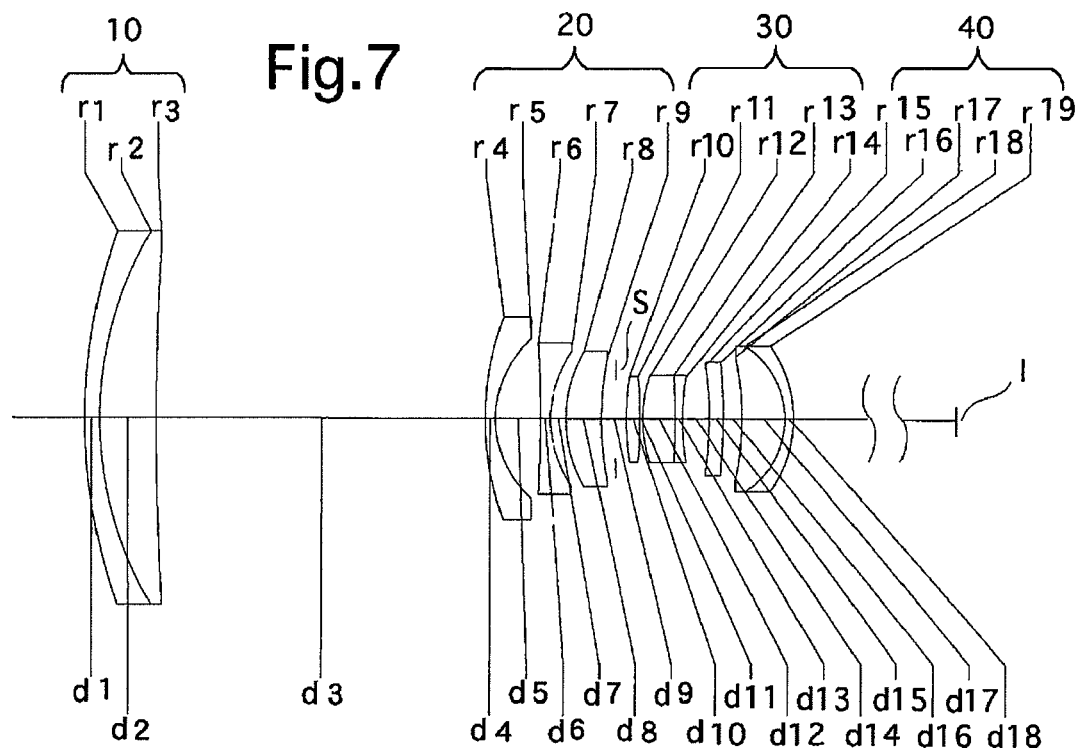
FIG. 7 is a lens arrangement of the standard zoom lens system, at the long focal length extremity, according to the second embodiment of the present invention.
Figures 8A, 8B, 8C, 8D, 8E:
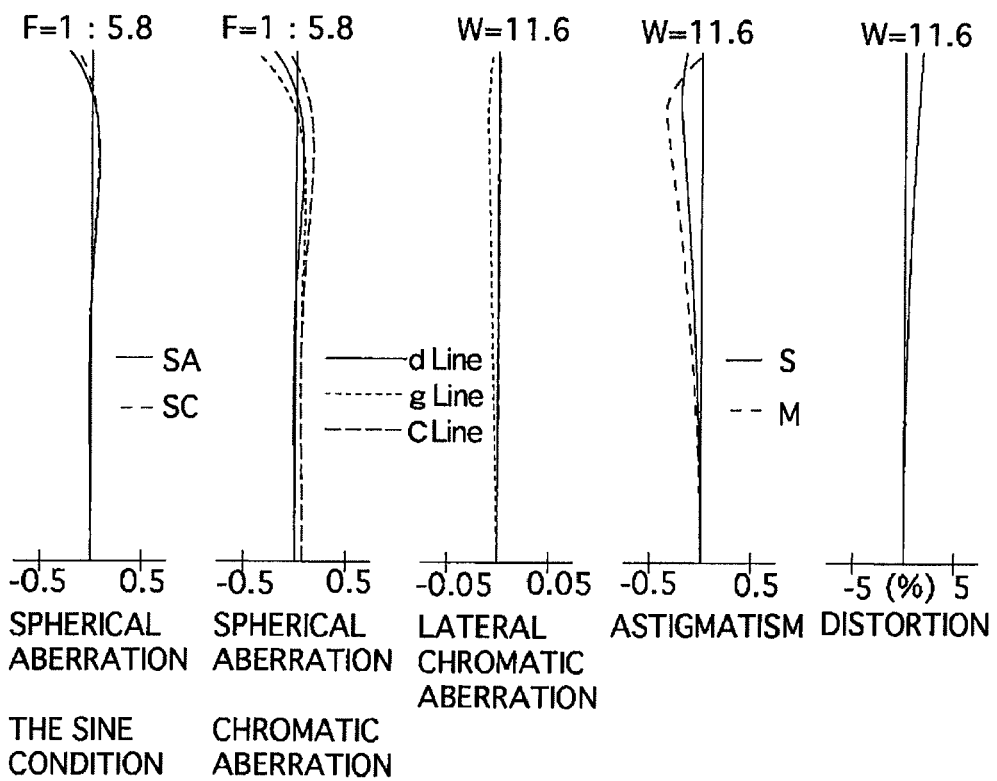
FIGS. 8A, 8B, 8C, 8D and 8E show aberrations occurred in the lens arrangement shown in FIG. 7.

FIG. 5 is a lens arrangement of the standard zoom lens system, at the short focal length extremity, according to the second embodiment of the present invention. FIGS. 6A through 6E show aberrations occurred in the lens arrangement shown in FIG. 5. FIG. 7 is a lens arrangement of the standard zoom lens system, at the long focal length extremity, according to the second embodiment of the present invention. FIGS. 8A through 8E show aberrations occurred in the lens arrangement shown in FIG. 7.

Table 2 shows the numerical data of the second embodiment.

The basic lens arrangement of the second embodiment is the same as that of the first embodiment except that in the positive fourth lens group 40, only the image-side surface of the positive aspherical meniscus lens element having a weaker refractive power is made aspherical.

The diaphragm S is provided 1.50 in front the third lens group 30 (surface No. 10).

TABLE 2

F = 1:4.1-4.8-5.8
f = 18.50-35.07-68.00 (Zoom Ratio = 3.68)
W = 38.8-21.9-11.6
fB = 39.44-54.44-71.79

| Surf. No. | r | d | Nd | ν |
|---|---|---|---|---|
| 1 | 75.330 | 2.00 | 1.80518 | 25.4 |
| 2 | 49.958 | 7.77 | 1.69680 | 55.5 |
| 3 | 382.312 | 2.50-21.00-45.31 | — | — |
| 4 | 39.893 | 1.40 | 1.77250 | 49.6 |
| 5 | 14.901 | 6.14 | — | — |
| 6 | −189.248 | 1.30 | 1.77250 | 49.6 |
| 7 | 16.310 | 2.12 | — | — |
| 8 | 18.232 | 4.87 | 1.84666 | 23.8 |
| 9 | 44.525 | 25.89-11.50-3.50 | — | — |
| 10 | 38.582 | 1.93 | 1.51823 | 59.0 |
| 11 | −62.277 | 0.40 | — | — |
| 12 | 18.485 | 4.49 | 1.48749 | 70.2 |
| 13 | −83.797 | 1.00 | 1.80610 | 40.9 |
| 14 | 35.970 | 7.10-5.00-3.64 | — | — |
| 15 | −50.501 | 2.00 | 1.54358 | 55.7 |
| 16* | −47.453 | 2.55 | — | — |
| 17 | −40.422 | 5.91 | 1.62299 | 58.2 |
| 18 | −11.985 | 1.20 | 1.80518 | 25.4 |
| 19 | 17.101 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 16 | 0.00 | $0.50660 \times 10^{-4}$ | $0.28783 \times 10^{-6}$ | $-0.17088 \times 10^{-8}$ |

Embodiment 3

Figure 9:
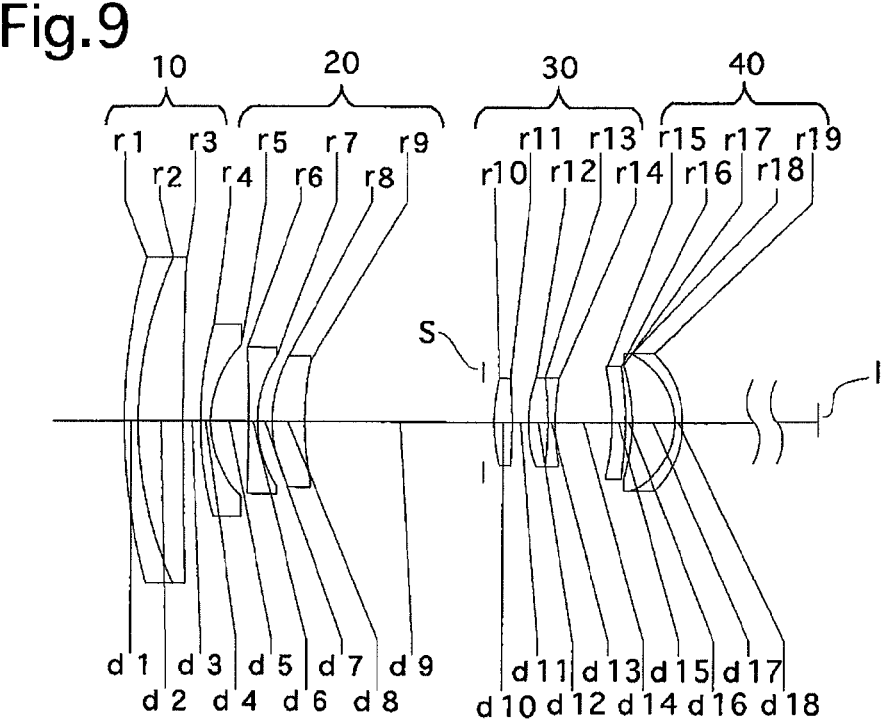
FIG. 9 is a lens arrangement of the standard zoom lens system, at the short focal length extremity, according to a third embodiment of the present invention.
Figures 10A, 10B, 10C, 10D, 10E:
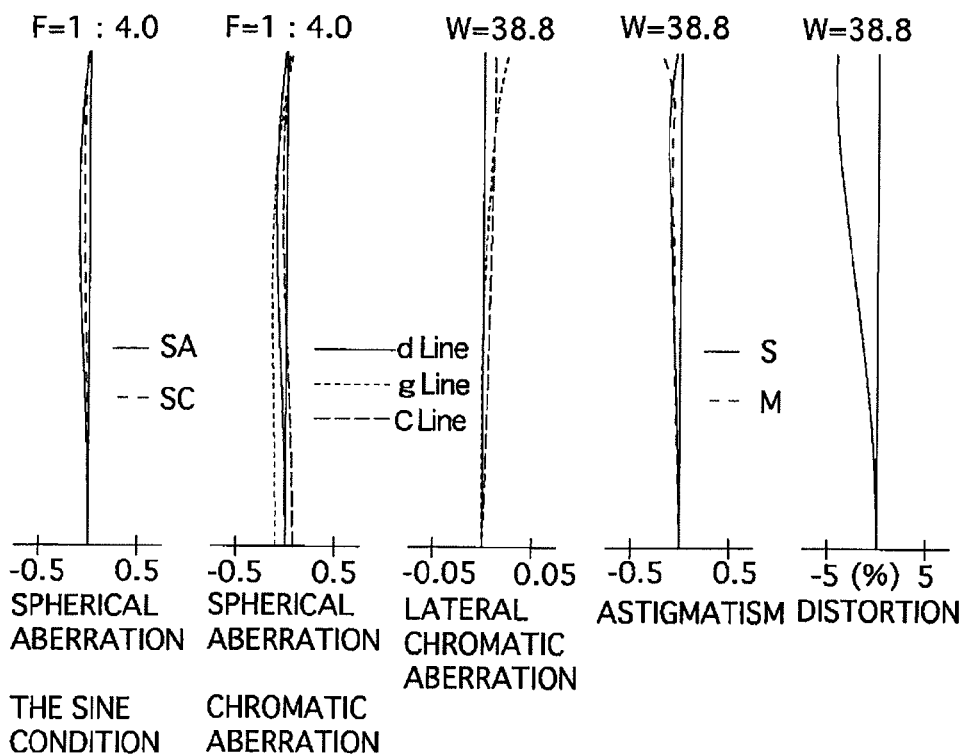
FIGS. 10A, 10B, 10C, 10D and 10E show aberrations occurred in the lens arrangement shown in FIG. 9.
Figure 11:
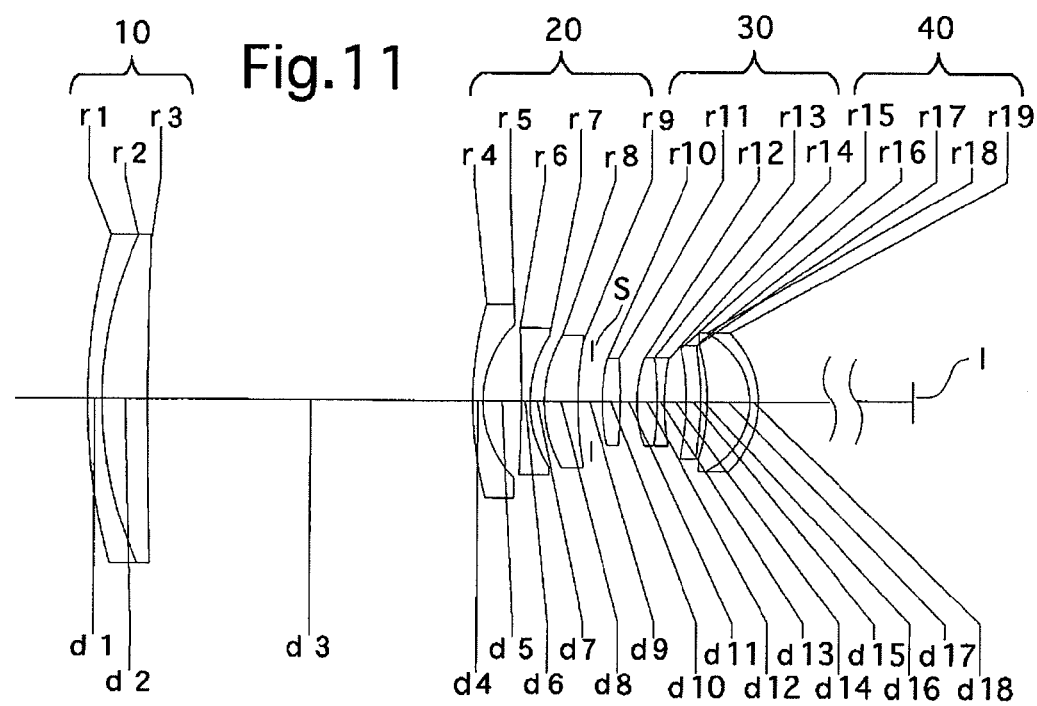
FIG. 11 is a lens arrangement of the standard zoom lens system, at the long focal length extremity, according to the third embodiment of the present invention.
Figures 12A, 12B, 12C, 12D, 12E:
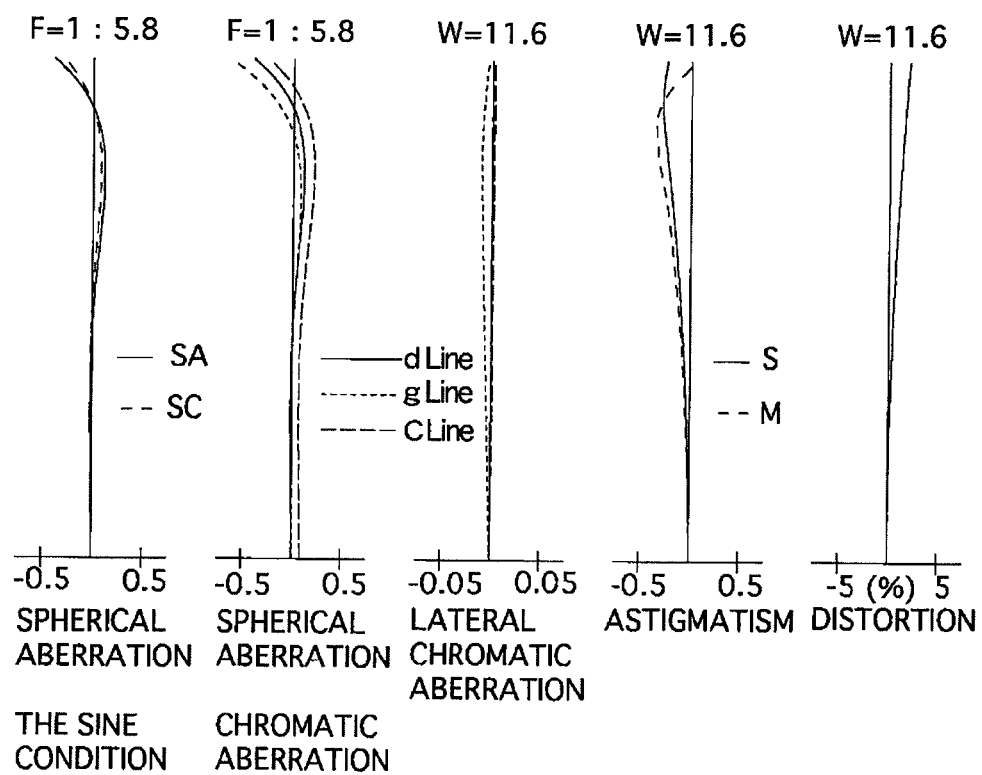
FIGS. 12A, 12B, 12C, 12D and 12E show aberrations occurred in the lens arrangement shown in FIG. 11.

FIG. 9 is a lens arrangement of the standard zoom lens system, at the short focal length extremity, according to the third embodiment of the present invention. FIGS. 10A through 10E show aberrations occurred in the lens arrangement shown in FIG. 9. FIG. 11 is a lens arrangement of the standard zoom lens system, at the long focal length extremity, according to the third embodiment of the present invention. FIGS. 12A through 12E show aberrations occurred in the lens arrangement shown in FIG. 11.

Table 3 shows the numerical data of the third embodiment.

The basic lens arrangement of the third embodiment is the same as that of the first embodiment.

The diaphragm S is provided 1.50 in front the third lens group 30 (surface No. 10).

TABLE 3

F = 1:4.0-4.8-5.8
f = 18.50-34.87-68.02 (Zoom Ratio = 3.68)
W = 38.8-22.0-11.6
fB = 39.44-56.32-74.97

| Surf. No. | r | d | Nd | ν |
|---|---|---|---|---|
| 1 | 85.488 | 2.00 | 1.80518 | 25.4 |
| 2 | 55.977 | 6.36 | 1.69680 | 55.5 |
| 3 | 678.470 | 2.50-19.00-45.66 | — | — |
| 4 | 51.189 | 1.40 | 1.77250 | 49.6 |
| 5 | 15.487 | 5.37 | — | — |
| 6 | −256.735 | 1.30 | 1.77250 | 49.6 |
| 7 | 17.057 | 2.03 | — | — |
| 8 | 18.510 | 4.68 | 1.84666 | 23.8 |
| 9 | 46.571 | 26.88-11.50-3.50 | — | — |
| 10 | 24.526 | 2.58 | 1.48749 | 70.2 |
| 11 | −76.618 | 2.32 | — | — |
| 12 | 19.014 | 2.80 | 1.48749 | 70.2 |
| 13 | −44.479 | 1.00 | 1.74400 | 44.8 |
| 14 | 35.612 | 8.02-4.80-3.13 | — | — |
| 15* | −35.677 | 2.00 | 1.52538 | 56.3 |
| 16* | −33.862 | 0.91 | — | — |
| 17 | −27.811 | 5.95 | 1.48749 | 70.2 |
| 18 | −10.810 | 1.20 | 1.80518 | 25.4 |
| 19 | −13.633 | — | — | — |

The symbol * designates the aspherical surface which is rotationally symmetrical with respect to the optical axis.

Aspherical surface data (the aspherical surface 25 coefficients not indicated are zero (0.00)):

| Surf. No. | K | A4 | A6 | A8 |
|---|---|---|---|---|
| 15 | 0.00 | $-0.90398 \times 10^{-5}$ | | |
| 16 | 0.00 | $0.64536 \times 10^{-4}$ | $0.37474 \times 10^{-6}$ | $-0.17095 \times 10^{-8}$ |

The numerical values of each condition for each embodiment are shown in Table 4.

TABLE 4

| | Embod. 1 | Embod. 2 | Embod. 3 |
|---|---|---|---|
| Condition (1) | 8.35 | 8.29 | 8.46 |
| Condition (2) | 3.83 | 3.82 | 4.31 |
| Condition (3) | 7.99 | 7.93 | 8.30 |
| Condition (4) | 0.96 | 0.96 | 0.98 |
| Condition (5)(Nn1) | 1.7725 | 1.7725 | 1.7725 |
| Condition (5)(Nn2) | 1.7725 | 1.7725 | 1.7725 |
| Condition (6) | 1.28 | 1.29 | 1.62 |
| Condition (7) | 0.73 | 0.73 | 0.71 |

TABLE 4-continued

|  | Embod. 1 | Embod. 2 | Embod. 3 |
|---|---|---|---|
| Refractive Power Ratio of each Lens Group | | | |
| First lens group | 1.0 | 1.0 | 1.0 |
| Second lens group | 8.3 | 8.3 | 8.5 |
| Third lens group | 3.8 | 3.8 | 4.3 |
| Fourth lens group | 3.0 | 3.0 | 2.7 |

As comparative examples, the numerical values with respect to each condition and the refractive-power ratio of the lens groups of the following prior-art unexamined patent publications are shown in Tables 5 through 8.

TABLE 5

Japanese Unexamined Patent Publication No.2002-6217

|  | Embod. 1 | Embod. 2 | Embod. 3 |
|---|---|---|---|
| Condition (1) | 4.19 | 4.23 | 3.65 |
| Condition (2) | 1.74 | 1.86 | 1.74 |
| Condition (3) | 3.29 | 3.40 | 3.35 |
| Condition (4) | 0.79 | 0.80 | 0.92 |
| Condition (5) (Nn1) | 1.8350 | 1.8350 | 1.8350 |
| Condition (5) (Nn2) | 1.4870 | 1.4870 | 1.4870 |
| Condition (6) | 1.05 | 1.20 | 1.04 |
| Condition (7) | 1.06 | 1.07 | 1.06 |
| Refractive Power Ratio of each Lens Group | | | |
| First lens group | 1.0 | 1.0 | 1.0 |
| Second lens group | 4.2 | 4.2 | 3.7 |
| Third lens group | 1.7 | 1.9 | 1.7 |
| Fourth lens group | 1.7 | 1.5 | 1.7 |

TABLE 6

Japanese Unexamined Patent Publication No. 2003-50350

|  | Embod. 1 | Embod. 2 | Embod. 3 |
|---|---|---|---|
| Condition (1) | 4.26 | 4.18 | 4.53 |
| Condition (2) | 1.98 | 1.92 | 2.08 |
| Condition (3) | 2.89 | 2.87 | 3.06 |
| Condition (4) | 0.68 | 0.69 | 0.68 |
| Condition (5) (Nn1) | 1.8348 | 1.8348 | 1.8348 |
| Condition (5) (Nn2) | 1.8040 | 1.7725 | 1.8160 |
| Condition (6) | 1.12 | 1.11 | 1.02 |
| Condition (7) | 0.91 | 0.92 | 0.90 |
| Refractive Power Ratio of each Lens Group | | | |
| First lens group | 1.0 | 1.0 | 1.0 |
| Second lens group | 4.3 | 4.2 | 4.5 |
| Third lens group | 2.0 | 1.9 | 2.1 |
| Fourth lens group | 1.8 | 1.7 | 2.0 |

TABLE 7

Japanese Unexamined Patent Publication No. 2004-37921

|  | Embod. 1 | Embod. 2 | Embod. 3 | Embod. 4 | Embod. 5 |
|---|---|---|---|---|---|
| Cond.(1) | 6.00 | 5.84 | 5.90 | 5.88 | 6.01 |
| Cond.(2) | 1.68 | 1.76 | 1.76 | 1.54 | 1.67 |
| Cond.(3) | 4.25 | 4.16 | 4.15 | 4.21 | 4.33 |
| Cond.(4) | 0.71 | 0.71 | 0.70 | 0.72 | 0.72 |
| Cond.(5)(Nn1) | 1.6031 | 1.6031 | 1.6031 | 1.6031 | 1.6031 |
| Cond.(5)(Nn2) | 1.8040 | 1.8040 | 1.8040 | 1.8040 | 1.8040 |
| Cond.(6) | 0.43 | 0.40 | 0.49 | 0.40 | 0.42 |
| Cond.(7) | 1.61 | 1.63 | 1.62 | 1.63 | 1.07 |

TABLE 7-continued

Japanese Unexamined Patent Publication No. 2004-37921

|  | Embod. 1 | Embod. 2 | Embod. 3 | Embod. 4 | Embod. 5 |
|---|---|---|---|---|---|
| Refractive Power Ratio of each Lens Group | | | | | |
| $1^{st}$ lens group | 1.0 | 1.0 | 1.0 | 1.0 | 1.0 |
| $2^{nd}$ lens group | 6.0 | 5.8 | 5.9 | 5.9 | 6.0 |
| $3^{rd}$ lens group | 1.7 | 1.5 | 1.8 | 1.5 | 1.7 |
| $4^{th}$ lens group | 3.9 | 3.8 | 3.6 | 3.9 | 4.0 |

TABLE 8

Japanese Unexamined Patent Publication No. 2004-333770

|  | Embod. 1 | Embod. 2 | Embod. 3 | Embod. 4 |
|---|---|---|---|---|
| Cond.(1) | 4.75 | 4.85 | 4.65 | 4.85 |
| Cond.(2) | 0.81 | 0.84 | 0.94 | 0.83 |
| Cond.(3) | 3.40 | 3.51 | 3.54 | 3.44 |
| Cond.(4) | 0.72 | 0.72 | 0.76 | 0.71 |
| Cond.(5)(Nn1) | 1.7432 | 1.7432 | 1.7432 | 1.7432 |
| Cond.(5)(Nn2) | 1.7130 | 1.7130 | 1.7130 | 1.7130 |
| Cond.(6) | 0.29 | 0.29 | 0.31 | 0.30 |
| Cond.(7) | 1.04 | 1.05 | 1.13 | 1.02 |
| Refractive Power Ratio of each Lens Group | | | | |
| $1^{st}$ lens group | 1.0 | 1.0 | 1.0 | 1.0 |
| $2^{nd}$ lens group | 4.7 | 4.9 | 4.6 | 4.8 |
| $3^{rd}$ lens group | 0.8 | 0.8 | 0.9 | 0.8 |
| $4^{th}$ lens group | 2.8 | 2.9 | 3.0 | 2.8 |

As can be understood from Table 4, the first through third embodiments of the present invention satisfy conditions (1) through (7), and as can be understood from the aberration diagrams, the various aberrations are well corrected.

Furthermore, as can be clearly understood upon comparing Table 4 (the present invention) with Tables 5 through 8 (the comparative examples), the refractive power distribution of each lens group in the embodiments of the present invention is completely different from those of the embodiments of each prior-art unexamined patent publication.

In other words, according to embodiments of the present invention, the refractive-power ratio of the positive first lens group 10, the negative second lens group 20, the positive third lens group 30 and the positive fourth lens group 40 is substantially 1:8:4:3, whereas in each of the unexamined patent publications, the refractive-power ratio of the first lens group with respect to the second lens group is weak, and the refractive-power ratio of the third lens group with respect to the fourth lens group is either 1:1, or, contrary to the present invention, a strong refractive power is distributed to the fourth lens group.

More specifically, Japanese Unexamined Patent Publication No. 2002-6217, similar to the present invention, discloses an interchangeable lens for a digital SLR camera; however, the half angle-of-view is approximately 27° at the short focal length extremity, which is very narrow. Accordingly, the refractive power distribution to each lens group is completely different from that of the present invention.

In Japanese Unexamined Patent Publication Nos. 2003-50350, 2004-37921 and 2004-333770, there is a description that the inventions therein "can also be used in a still video camera"; however, even considering the image height which is indicated after aberrations have been corrected, it is understood that each invention in these publications are for use in a SLR camera with 35 mm-film format, and no consideration has been taken to achieving both a shorter focal length and a longer back focal distance. Accordingly, the refractive power distribution to each lens group are completely different from those of the present invention.

According to the present invention, a standard zoom lens system which is miniaturized and has superior optical performance with the following features can be attained, while the standard zoom lens system has a longer back focal distance compared with the focal length:

(i) a zoom ratio is 3.7 (a higher zoom ratio); and (ii) an angle-of-view is approximately 23° at the short focal length extremity, and is 80° at the long focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A standard zoom lens system comprises a positive first lens group, a negative second lens group, a positive third lens group and a positive fourth lens group, in this order from an object, wherein upon zooming from the short focal length extremity to the long focal length extremity, said positive first lens group, said positive third lens group and said positive fourth lens group move toward the object, and said negative second lens group moves toward an image and thereafter moves toward the object;

wherein said positive first lens group consists of a negative lens element and a positive lens element; and wherein said standard zoom lens system satisfies the following conditions:

$7.5 < f1/|f2| < 9.5$ $3.0 < f1/f3 < 5.0$ wherein f1 designates the focal length of said positive first lens group;

f2 designates the focal length of said negative second lens group; and f3 designates the focal length of said positive third lens group.

2. The standard zoom lens system according to claim 1, satisfying the following condition:

$7.0 < f1/fw < 10.0$ wherein f1 designates the focal length of said positive first lens group; and fw designates the focal length of said entire standard zoom lens system at the short focal length extremity.

3. The standard zoom lens system according to claim 1, wherein said negative lens element and said positive lens element of said positive first lens group are cemented to each other.

4. The standard zoom lens system according to claim 1, wherein said negative second lens group comprises two negative lens elements and a positive lens element.

5. The standard zoom lens system according to claim 4, wherein said negative second lens group comprises a negative meniscus lens element having the convex surface facing toward the object, a negative lens element having a concave surface facing toward the image, and a positive lens element having a convex surface facing toward the object, in this order from the object.

6. The standard zoom lens system according to claim 4, satisfying the following condition:

$0.7 < |f2|/fw < 1.2$ wherein f2 designates the focal length of said negative second lens group; and fw designates the focal length of said entire standard zoom lens system at the short focal length extremity.

7. The standard zoom lens system according to claim 4, satisfying the following condition:

$1.68 < Nn < 1.79$ wherein

Nn designates the refractive index of the d-line of each negative lens element in the negative second lens group.

8. The standard zoom lens system according to claim 1, wherein said positive fourth lens group comprises one of a positive aspherical lens element and a negative aspherical lens element, and cemented lens elements having a positive lens element and a negative lens element.

9. The standard zoom lens system according to claim 1, satisfying the following condition:

$1.0 < f4/f3 < 3.0$ wherein f4 designates the focal length of said positive fourth lens group; and f3 designates the focal length of said positive third lens group.

10. The standard zoom lens system according to claim 1, satisfying the following condition:

$0.6 < |f12w|/f34w < 0.8$ wherein f12w designates the combined focal length of the positive first lens group and the negative second lens group at the short focal length extremity; and f34w designates the combined focal length of said positive third lens group and said positive fourth lens group at the short focal length extremity.

11. A standard zoom lens system comprises a positive first lens group, a negative second lens group, a positive third lens group and a positive fourth lens group, in this order from an object, wherein upon zooming from the short focal length extremity to the long focal length extremity, said positive first lens group, said positive third lens group and said positive fourth lens group move toward the object, and said negative second lens group moves toward an image and thereafter moves toward the object;

wherein said positive first lens group comprises a negative lens element and a positive lens element;

wherein said negative second lens group comprises two negative lens elements and a positive lens element; and wherein said standard zoom lens system satisfies the following conditions:

$7.0 < f1/fw < 10.0$ $1.68 < Nn < 1.79$ wherein f1 designates the focal length of said positive first lens group;

fw designates the focal length of said entire standard zoom lens system at the short focal length extremity; and Nn designates the refractive index of the d-line of each negative lens element in the negative second lens group.

12. The standard zoom lens system according to claim 11, wherein said negative lens element and said positive lens element of said positive first lens group are cemented to each other.

13. The standard zoom lens system according to claim 11, wherein said negative second lens group comprises a negative meniscus lens element having the convex surface facing toward the object, a negative lens element having a concave surface facing toward the image, and a positive lens element having a convex surface facing toward the object, in this order from the object.

14. The standard zoom lens system according to claim 11, satisfying the following condition:

$$0.7 < |f2|/fw < 1.2$$

wherein
f2 designates the focal length of said negative second lens group; and
fw designates the focal length of said entire standard zoom lens system at the short focal length extremity.

15. The standard zoom lens system according to claim 11, wherein said positive third lens group comprises a positive lens element, and cemented lens elements having a positive lens element and a negative lens element.

16. The standard zoom lens system according to claim 11, wherein said positive fourth lens group comprises one of a positive aspherical lens element and a negative aspherical lens element, and cemented lens elements having a positive lens element and a negative lens element.

17. The standard zoom lens system according to claim 11, satisfying the following condition:

$$1.0 < f4/f3 < 3.0$$

wherein
f4 designates the focal length of said positive fourth lens group; and
f3 designates the focal length of said positive third lens group.

18. The standard zoom lens system according to claim 11, satisfying the following condition:

$$0.6 < |f12w|/f34w < 0.8$$

wherein
f12w designates the combined focal length of the positive first lens group and the negative second lens group at the short focal length extremity; and
f34w designates the combined focal length of said positive third lens group and said positive fourth lens group at the short focal length extremity.

19. A standard zoom lens system comprises a positive first lens group, a negative second lens group, a positive third lens group and a positive fourth lens group, in this order from an object,
wherein upon zooming from the short focal length extremity to the long focal length extremity, said positive first lens group, said positive third lens group and said positive fourth lens group move toward the object, and said negative second lens group moves toward an image and thereafter moves toward the object;
wherein said positive first lens group comprises a negative lens element and a positive lens element;
wherein said positive third lens group comprises a positive lens element, and cemented lens elements having a positive lens element and a negative lens element; and
wherein said standard zoom lens system satisfies the following conditions:

$$7.5 < f1/|f2| < 9.5$$

$$3.0 < f1/f3 < 5.0$$

wherein
f1 designates the focal length of said positive first lens group;
f2 designates the focal length of said negative second lens group; and
f3 designates the focal length of said positive third lens group.

* * * * *